Feb. 23, 1926.
H. B. HARTMAN
1,574,389
WATER PURIFYING APPARATUS
Filed April 15, 1921    3 Sheets-Sheet 2
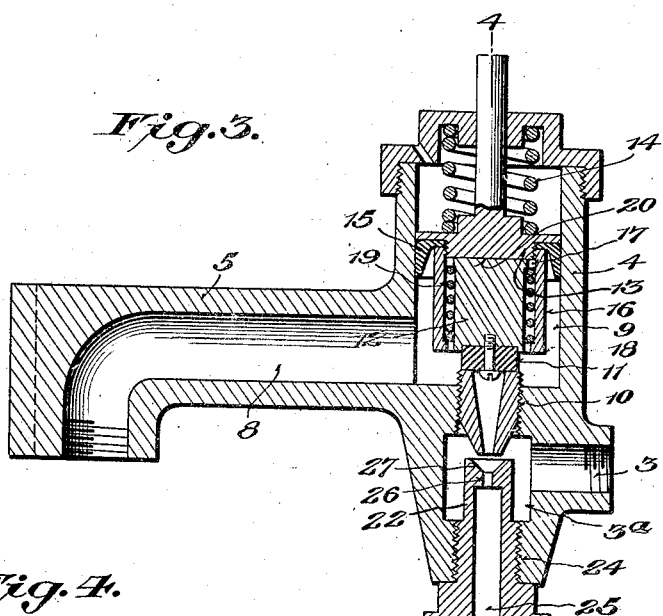
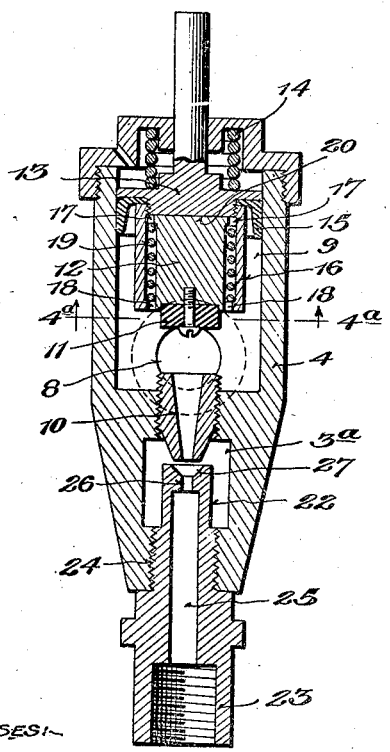
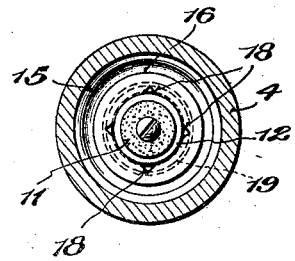
Inventor
H. B. Hartman,
By
Attorney Feb. 23, 1926.
H. B. HARTMAN
1,574,389
WATER PURIFYING APPARATUS
Filed April 15, 1921   3 Sheets-Sheet 3
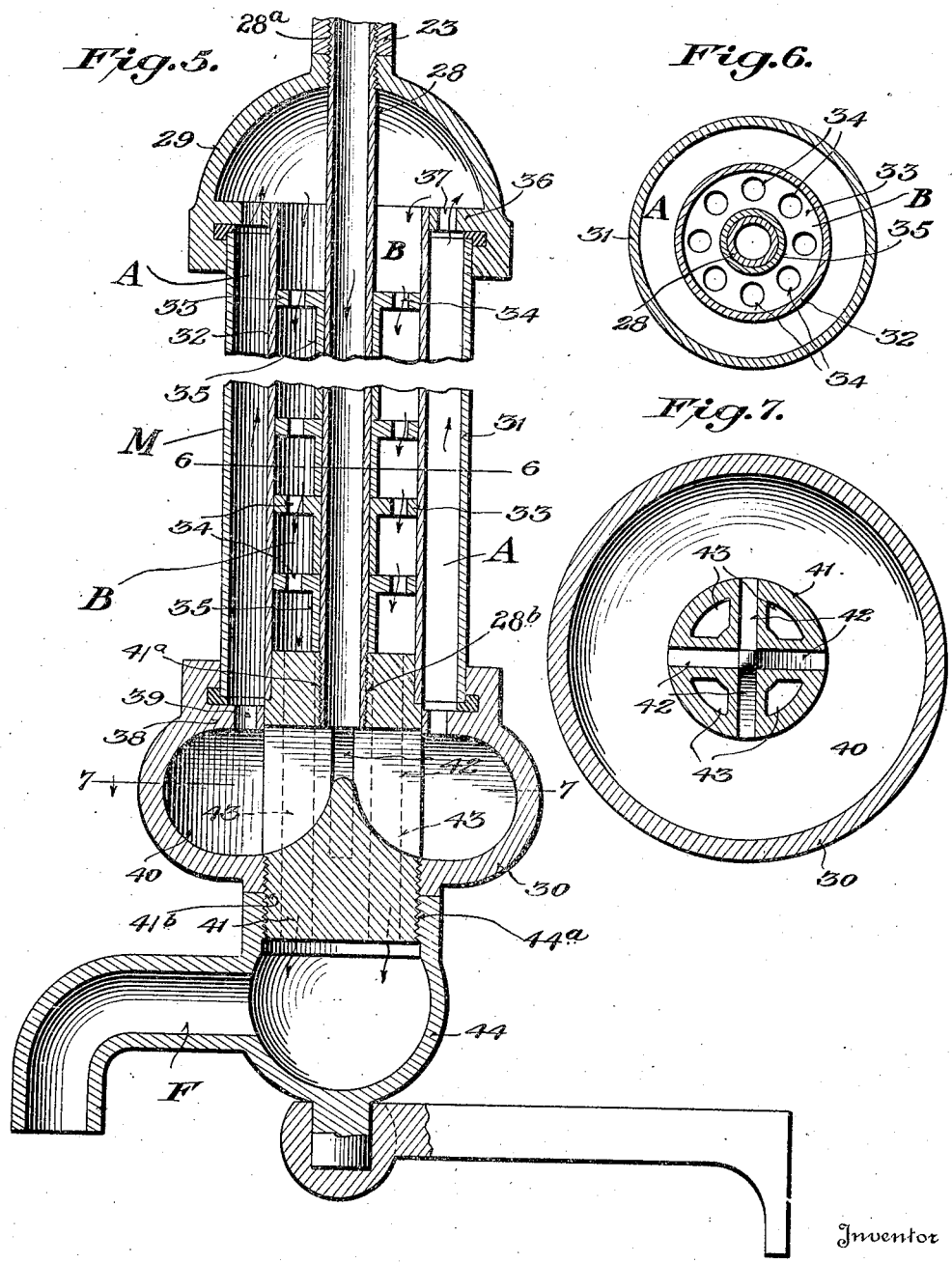

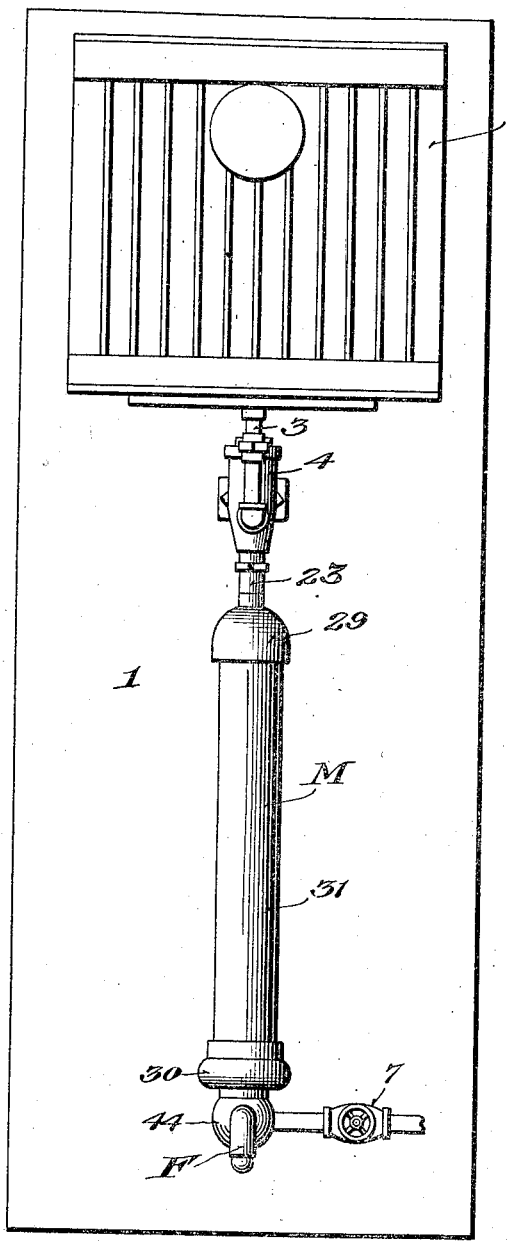

Patented Feb. 23, 1926.

1,574,389

UNITED STATES PATENT OFFICE.

HARRY BUXTON HARTMAN, OF SCOTTDALE, PENNSYLVANIA.

WATER-PURIFYING APPARATUS.

Application filed April 15, 1921. Serial No. 461,504.

*To all whom it may concern:*

Be it known that I, HARRY B. HARTMAN, citizen of the United States, residing at Scottdale, in the county of Westmoreland and State of Pennsylvania, have invented certain new and useful Improvements in Water-Purifying Apparatus, of which the following is a specification.

This invention relates to an improvement in water purifying apparatus of the type in which ozone or the like is used as the purifying agent.

A primary object of the invention is to provide a machine particularly adapted for household use or similar installations. In machines of that character it is desirable to have all of the necessary instrumentalities assembled in a convenient and compact manner so that the entire apparatus may be handled as a unit and take up as little space as possible, while at the same time having all of the advantages of automatic control and operation.

A further object of the invention is to provide means for thoroughly bringing the ozone into contact with the water to insure complete sterilization and without back pressure to impede the rate of liquid flow. That is, it is proposed to provide a novel mixing device for breaking up or agitating the water in the presence of the ozone gas so that all parts thereof are evenly and unifomly ozonated or acted upon by the purifying agent.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which.

Figure 1 is an elevation of the improved machine.

Figure 2 is a side elevation thereof.

Figure 3 is a detail sectional view of the automatic valve for starting the operation of the ozone generator upon the opening of the water line, and also showing the injector device.

Figure 4 is a vertical sectional view of the automatic valve taken at right angles to Figure 3.

Figure 4ª is a horizontal cross sectional view of the plunger shown in Figure 4.

Figure 5 is a vertical sectional view of the novel mixing unit.

Figure 6 is a cross sectional view taken on the line 6—6 of Figure 5.

Figure 7 is a cross sectional view taken on the line 7—7 of Figure 5.

Similar reference characters designate corresponding parts throughout the several figures of the drawings.

The present invention may be carried into effect in various forms, but to adapt the same particularly for household installations and the like, it is preferred to utilize the general arrangement shown in the accompanying drawings, wherein it will be observed from Figures 1 and 2 that the entire apparatus may be carried upon a suitable base 1 that may be conveniently handled and placed with reference to the point of use. Also, from the figures referred to, it will be seen that the said base 1 preferably carries an ozone generator 2 having the ozone outlet connection 3 leading to an injector device 4 which may be a part of the casing of an automatic valve device 5. This valve device opens and closes an electrical circuit to the ozone generator 2 upon the opening of the water supply line 6 which leads into the said casing of the valve 5 as clearly shown in Figure 2 and is provided with a conventional turn cock or valve 7 for controlling the supply of raw or untreated water to the valve device 5. When water pressure is admitted into the casing of the valve, as will presently appear, the stem S of the said valve will operate an electrical switch through the stem S' to close a circuit to the generator 2 for generating ozone. As the switch is closed only when water is flowing through the valve, ozone is generated only when the machine is in use. Upon the closing of the switch by the automatic valve the ozone generator 2 immediately functions and ozone gas is readily available so that water passing through the injector device 4 will draw about an equal volume of ozone through the conduit 3 and discharge both the ozone and water into the novel mixing device M wherein the water is thoroughly ozonized and finally discharged in its purified state from the outlet or faucet F.

Referring now to the automatic valve device 5, it will be observed from Figures 3 and 4 of the drawings that when the valve 7 in the supply line is open, the raw water will flow through the pipe 6 into the valve chamber 8 which includes a plunger chamber 9. At the bottom of this chamber 9 is an injector nozzle 10 that is normally sealed by a suitable washer or gasket 11 carried by a valve or sealing head 12 mounted within and carried by a main actuating plunger 13. The said main plunger 13 carries the switch operating stem S previously referred to and may be maintained in its normal closed position by a relatively stout coil spring 14, and for the purpose of providing an effective water seal between its side edge and the side of the chamber 9, a suitable leather cup washer 15 may be used.

The said sealing head 12 which carries the washer 11 is held retracted within the body of the main plunger 13 by a relatively light coil spring 16 which engages behind the annular shoulder 17 at the top of the head while its other end abuts against the inturned annular shoulder 18 at the bottom edge of the main plunger 13.

When water enters the chamber 9 and accumulates sufficient pressure therein to offset the force of spring 14, the main plunger 13 begins to rise, thereby breaking the surface tension between the surface 20 of the body of the head 12 and the plunger 13, and due to the openings 19 with which the head is provided, water will pass to the rear of said face 20 and have the effect of temporarily holding the washer 11 to its seat on the injector nozzle 10 during the preliminary lifting movement of the main plunger 13. When the plunger 13 elevates sufficiently to cause the spring 16 to be compressed to its limit, the water seal existing between the nozzle 10 and the plunger 11 will be broken and the spring 16 will cause the head 12 to recede into the body of the plunger 13 as shown in Figure 4, thus fully opening the line of communication between the chamber 8 and the bore of the injector nozzle 10. Also by holding the washer 11 to its seat until the plunger has nearly completed its upward stroke the switch of the ozone generator is thrown to its closed position to start the ozone generating action slightly in advance of the passage of water through the injector nozzle 10 to thereby insure a supply of ozone for simultaneously mixing with the water as it passes through the injector.

Water discharge from the nozzel 10 of the injector device 4 draws ozone from the ozone generator through the conduit 3 and into the ozone collecting chamber 3$^a$ which surrounds the intake nozzle of an injector plug 23 which may be detachably fitted to the body of the valve casing as indicated at 24. This plug is provided with the hollow interior bore 25 which communicates through the jet orifice 26 with the substantially conical receiving well 27 arranged at the discharge end of the nozzle 10 to receive the discharge of water therefrom. Obviously, the rapid discharge of water from the nozzle into the well 27 will cause the ozone to be sucked from the chamber 3$^a$ through the orifice 26 and into the bore 25 along with the water, which passes into the central pipe 28 that constitutes the receiving conduit of the mixing device M.

The said mixing device M constitutes one of the novel and distinctive features of the present invention and preferably consists of a casing having concentric passage-ways some of which have baffle units therein for agitating the water in the presence of the ozone gas as it is carried along with the water by the momentum of its passage through the mixing device. This mixing unit M includes in addition to the central inlet pipe member 28 previously referred to, a suitable cap member 29 and a novel base 30 which will be presently referred to more in detail. Between the cap 29 and base 30 are clamped the outer and inner cylinders or shells 31 and 32 which are concentric with the conduit 28 and provide the passage-ways A and B for the ozone and water. The passage-way B formed by the inner cylinder 32 and the pipe 28 is preferably provided with a plurality of baffle units 33 which may take the form of annular rings with perforations 34, having suitable spacing sleeve portions 35 which enable them to be stacked about the central conduit 28 as clearly shown in Figure 5 of the drawings to provide for thorough agitation of the water in the presence of the ozone gas. These baffle units may be multiplied to any desired extent to meet the requirements of the height of the mixing column and by staggering the perforations in the baffle units 33, an exceptionally effective mixing of the ozone and water is insured.

The cap 29 is preferably provided with an interior wall 36 having the perforations 37 arranged to communicate with the passage-way A formed between the outer and inner cylinders 31 and 32, and likewise the base 30 is provided with a wall 38 having the perforations 39 for establishing communication between the relatively large annular chamber 40 provided by the base and the bottom of the passage-way A.

For the purpose of insuring the proper transfer of water from one passage-way to the other, the said base 30 is preferably provided with a novel distributing core plug 41 which may be detachably fitted into the base in such a manner as to receive the lower end of the central conduit 28. This plug is provided directly beneath the discharge end of said pipe 28 with a plurality of channels or passages 42 for causing the water discharged from the said pipe to divide and flow radially toward the peripheral edges of the chamber 40. The said distributing plug 41 is also provided with a plurality of vertical openings 43 which extend from one end to the other of the plug and through the walls or webs between the slots or passages 42, to thereby establish communication between the inner passageway B and the receiving bowl 44 of the draw-off faucet F previously referred to.

Another novel and distinctive feature of the invention is the manner of assembling the several parts of the mixing unit M. As will be observed from the drawings, the central inlet pipe 28 is threaded at its upper end as at 28ᵃ to fit in the threaded socket of the plug 23, and when thus engaged, the cap 29 may be slipped over the pipe and into abutting relation with the end of the said plug 23. The body of the inlet pipe may then have fitted thereon the baffle disks 33, and then the inner cylinder 32 may be placed over or about the disks. And, for the purpose of holding the disks and inner shell 32 in place the distributing plug 41 is provided with threads as at 41ᵃ to fit on the threaded portion 28ᵇ of the inlet pipe, and when the said distributing plug is thus attached to the inlet pipe, the outer shell 31 may be fitted into the proper portion of the cap 29 and around the inner shell 32. The base 30 may next be slipped over the plug 41 to hold the shells 31 and 32 centered. The bowl portion 44 is preferably threaded as at 44ᵃ to engage with the threaded portion 41ᵇ of the plug, and when the said bowl portion 44 is screwed on to the end of the plug, it will drive the base toward the cap and hold all of the parts between the cap and base tightly in assembled relation.

The arrangement above described provides in effect a mixing column for the water and ozone which consists of the casing formed by the outer shell 31 and cap and base members 29 and 30, the same being provided with means at the top for receiving raw water and ozone, and at the bottom an outlet for the treated water. The particular arrangement of concentric shells 31 and 32, in combination with the central inlet pipe 28 and the cap and base members 29 and 30 provides in effect a looped circuit for the water and ozone which increases the length of passage to a maximum extent, thus insuring the proper mixing of the ozone and water. To illustrate, the ozone and water forced through the central conduit 28 will be discharged into the channels of the distributing plug and into the annular chamber 40 of the base, and from there they will pass upwardly through the openings 39 into the passage-way A between the outer and inner cylinders 31 and 32, and also through the openings 37 in the wall 36 of the cap. From this point, the liquid and gas flow downwardly through the passage B having the baffles 33 located therein, and when they reach the bottom of this passage in a thoroughly mixed condition, the purified water will flow through the openings 43 into the receiving bowl 44 and out of the spout of the faucet F.

From the foregoing, it is thought that the features and advantages of the invention will be readily apparent, and it will of course be understood that changes in the form, proportion and minor details of construction may be resorted to without departing from the spirit of the invention or scope of the appended claims.

I claim:

1. A water purifying apparatus including a mixing device having a casing consisting of a cap and base, concentric shell members clamped between the cap and base, a central inlet pipe, means for causing liquid supplied from said central conduit pipe to flow into the passage formed by the outermost of said concentric shell members, and means for permitting the exit of the water from the passage formed between the innermost shell and the inlet pipe and thence through the said base member.

2. A water purifying apparatus including a mixing unit having a casing consisting of a central liquid conduit member, a cap fitted thereon, shell members fitted one within the other and arranged concentrically with said central liquid conduit member, a distributing plug fitted to the end of said central conduit member, a base fitted over said plug and adapted to clamp the shell members between the same and the cap, and an outlet member adapted to be fitted onto said plug to thereby work in opposition to the cap to cause the base to hold the said shell members in assembled relation.

3. A water purifying apparatus having a mixing column including a plug having through passages and lateral openings, an inlet pipe connected with the plug and discharging into said lateral openings, a chamber forming unit surrounding the plug and communicating with said lateral openings, a plurality of tubular members arranged concentric with the discharge pipe and supported by the plug and chamber forming member, and a cap for covering the upper end of the tubular members.

4. A water purifying apparatus having a mixing column including a plug having through passages and lateral openings, an inlet pipe connected with the plug and discharging into said lateral openings, a chamber forming unit surrounding the plug and communicating with said lateral openings, a plurality of tubular members arranged concentric with the discharge pipe and supported by the plug and chamber forming member, a cap for covering the upper end of the tubular members, and a plurality of baffle members arranged concentric with the discharge pipe and located in the inner tubular member and baffling the course of the fluids before they reach the through passages of the plug.

5. A water purifying apparatus including a mixing unit having a casing consisting of a base and a cap, a plurality of concentric shell members held between said cap and base, a central ozone and water inlet pipe, a plurality of baffle elements surrounding said pipe and arranged in the passage provided between the pipe and one of said shell members, and means in the base for directing ozone and water supplied by said pipe to traverse the length of the passages provided between the said concentric shells.

6. A mixing unit for water purifying apparatus including a casing consisting of inner and outer shells and a central inlet pipe, cap and base members having means for holding said shell members in concentric relation, and means in the base for directing the fluids from the inlet pipe to the outer chamber formed by the inner and outer shells, and then from the inner chamber formed by the central pipe and the inner shell to the discharge pipe.

7. A mixing unit for water purifying apparatus including a casing consisting of inner and outer shells and a central inlet pipe, cap and base members having means for holding said shell members in concentric relation and said base including a chambered member communicating with the space between the inner and outer shells, and a plug fitted in the space between the pipe and the inner shell and having passages therein communicating with said space, and other passages communicating with the pipe and with the chambered member.

8. A water purifying apparatus including a tubular mixing casing having a plurality of concentric compartments therein, and a base member consisting of an outer member and an inner member detachably interfitting, and said inner member having laterally opening passages and through openings whereby to provide continuous communication between said compartments and to also provide a discharge outlet therefor.

In testimony whereof I hereunto affix my signature.

HARRY BUXTON HARTMAN.